(12) United States Patent
Spohr et al.

(10) Patent No.: US 8,413,063 B2
(45) Date of Patent: Apr. 2, 2013

(54) CONVERSION AND QUERY FOR DATA DRAGGED ON WEB-SITES

(75) Inventors: Aron Spohr, London (GB); Rajit Bhanu Singh, London (GB)

(73) Assignee: Yahoo! Inc., Sunnyvale, CA (US)

( * ) Notice: Subject to any disclaimer, the term of this patent is extended or adjusted under 35 U.S.C. 154(b) by 699 days.

(21) Appl. No.: 12/352,902

(22) Filed: Jan. 13, 2009

(65) Prior Publication Data

US 2010/0161582 A1 Jun. 24, 2010

Related U.S. Application Data

(63) Continuation of application No. 12/340,400, filed on Dec. 19, 2008.

(51) Int. Cl.
*G06F 3/048* (2006.01)
*G06F 17/30* (2006.01)
(52) U.S. Cl. ........................... 715/769; 707/706
(58) Field of Classification Search .................. 715/769; 707/706
See application file for complete search history.

(56) References Cited

U.S. PATENT DOCUMENTS

| 6,721,951 | B1 | 4/2004 | Williams et al. |
| 2006/0059247 | A1* | 3/2006 | Marappan et al. ............. 709/219 |
| 2007/0073675 | A1 | 3/2007 | Kaar et al. |
| 2008/0115075 | A1* | 5/2008 | Ryan et al. .................... 715/769 |
| 2008/0195492 | A1* | 8/2008 | Postrel ............................. 705/14 |
| 2008/0201656 | A1* | 8/2008 | Kim et al. ...................... 715/770 |
| 2009/0241137 | A1 | 9/2009 | Megiddo et al. |
| 2010/0030753 | A1 | 2/2010 | Nad |
| 2010/0162154 | A1 | 6/2010 | Singh et al. |

OTHER PUBLICATIONS

U.S. Office Action dated Jun. 23, 2011, U.S. Appl. No. 12/340,400.
U.S. Final Office Action dated Jan. 4, 2012, U.S. Appl. No. 12/340,400.
U.S. Office Action dated Aug. 20, 2012, U.S. Appl. No. 13/340,400.

\* cited by examiner

*Primary Examiner* — Matt M. Kim
*Assistant Examiner* — Andrea Leggett
(74) *Attorney, Agent, or Firm* — Weaver Austin Villeneuve & Sampson LLP

(57) ABSTRACT

A service performs transformation for material that has been dragged in one format from a web-site and has to be transformed first in order to be dropped onto a different web-page. The transformation makes it possible for the target (drop) page to understand and process the data. A target page need only support one format rather than numerous possible formats used by source pages.

20 Claims, 10 Drawing Sheets

CONVERSION AND QUERY FOR DATA DRAGGED ON WEB-SITES

CROSS REFERENCE TO RELATED APPLICATION

The present application is a continuation and claims priority under 35 U.S.C. 120 to U.S. patent application Ser. No. 12/340,400 for CONVERSION SERVICE FOR DATA DRAGGED ON WEB-SITES filed on Dec. 19, 2008, the entire disclosure of which is incorporated herein by reference.

BACKGROUND OF THE INVENTION

This invention relates generally to graphical user interfaces and web browsing.

The vast majority of computing devices today have a graphical user interface ("GUI") built on the what you see is what you get ("WYSIWYG") principle. Users have come to expect a high degree of interoperability between programs, even if they come from different sources and are designed to perform different functions.

Different programs and types of programs utilize different formats for similar objects and content, whether the graphically or alphanumerically. Therefore, the content of an object dragged and dropped from one type of program to another, or even between similar programs of different providers, is often not recognized and utilized by the receiving program. In other words, something dropped from a first page or program may not look like it originally did or contain the relevant data and formatting that it originally possessed.

SUMMARY OF THE INVENTION

A service performs transformation for material that has been dragged in one format from a web-site and has to be transformed first in order to be dropped onto a different webpage. The transformation makes it possible for the target (drop) page to understand and process the data. A target page need only support one format rather than numerous possible formats used by source pages. At the same time the data transformation service can act as a security proxy and filter details out or warn if sensitive data has been dragged.

One embodiment relates to a computer program product, comprising a computer usable medium having a computer readable program code embodied therein. The computer readable program code is adapted to be executed to facilitate drag and drop operations in a graphic user interface. The method comprises: detecting the start of a drag operation at a first location; attaching material in a first format at the first location to be dragged to a second location; detecting an indication of a drop operation at the second location; determining a second format required at the second location; determining if a conversion path exists from the first format to the second format; and if a conversion path is determined to exist, converting the material from the first format to the second format as part of a drop operation.

Another embodiment relates to a computer implemented method for analyzing a plurality of groupings of material and providing information relevant to the plurality of groupings. The method comprises detecting the start of a drag operation at a first location of a first grouping of material indicative of an address or location; receiving the material from the first location in the first format at the drag bar; detecting the start of a drag operation at a second location of a second grouping of material indicative of a good or service desired; receiving the material from the second location at the drag bar; and coalescing the material received at the drag bar into a serviceable query.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Microformats are a set of simple, open data formats built upon existing and widely adopted standards. Numerous different microformats exist, as do drafts for additional microformats. Undoubtedly, additional microformats will be developed in time. Some currently available microformat open standard specifications include:
hCalendar—hCalendar creator
hCard—hCard creator
rel-license
rel-nofollow
rel-tag
VoteLinks
XFN—XFN creator
XMDP
XOXO Some current draft microformat specifications include:

adr—for marking up address information geo—for marking up WGS84 geographic coordinates (latitude; longitude)

hAtom—syndicating episodic content (e.g. weblog postings)

hResume—for publishing resumes and CVs hReview—hReview creator rel-directory—to indicate that the destination of a hyperlink is a directory listing containing an entry for the current page rel-enclosure—for indicating attachments (e.g. files) to download and cache rel-home—indicate a hyperlink to the homepage of the site rel-payment—indicate a payment mechanism robots exclusion xFolk hAudio hRecipe Another understanding of microformats is that they are simple conventions for embedding semantics in HTML to enable decentralized development. For more information on these and other microformats, please refer to the microformats.org web site, available at www.microformats.org/wiki/Main_Page.

Additionally, numerous proprietary formats exist and will be developed in time. Embodiments of the invention can convert between different formats, including open and proprietary data formats. The term microformat, for purposes of this application, shall include open and proprietary formats, and shall be used interchangeably with the term format.

Figure 1A:
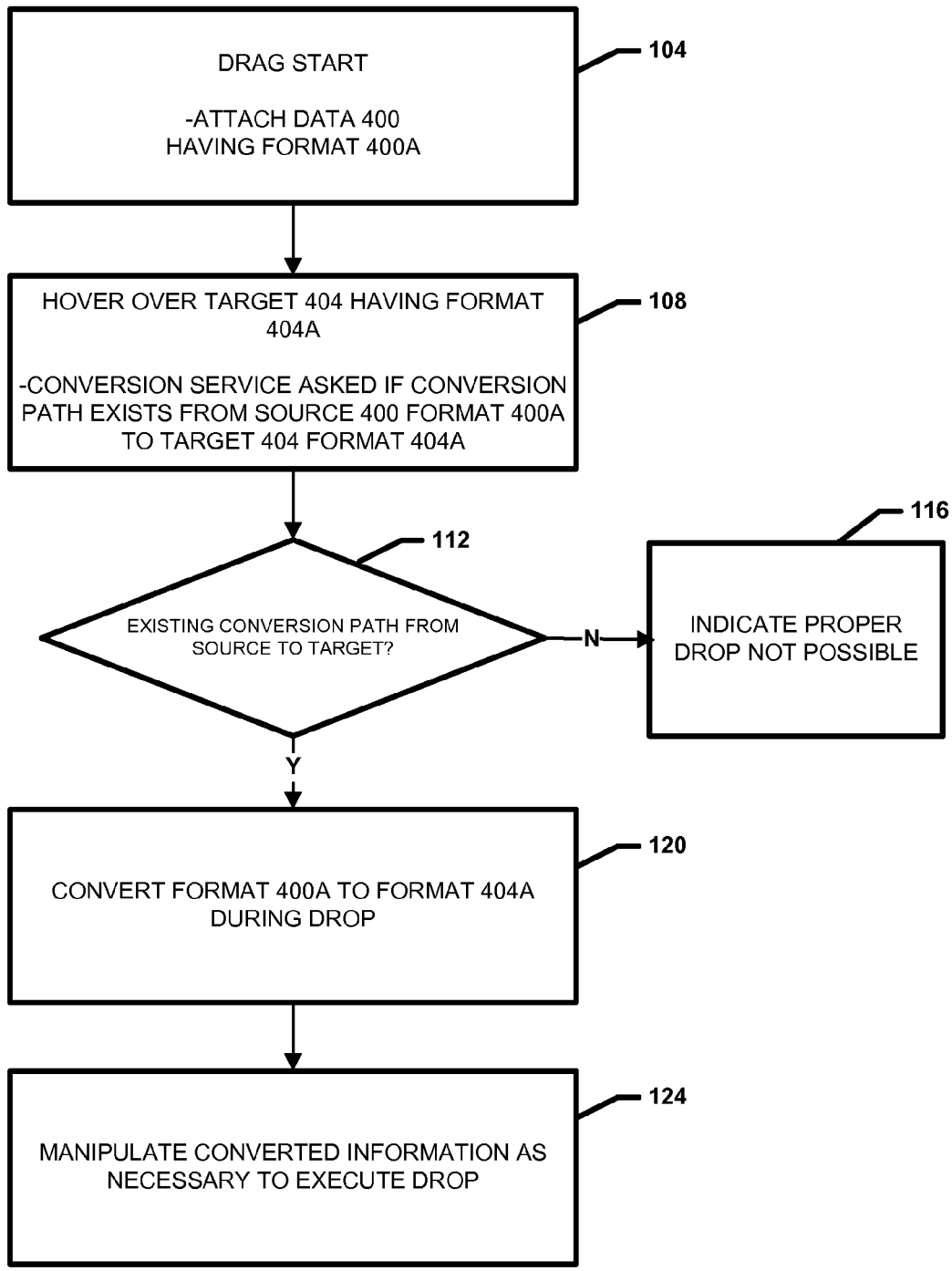
FIG. 1A is a flow chart of a process according to an embodiment of the present invention.
Figure 1B:
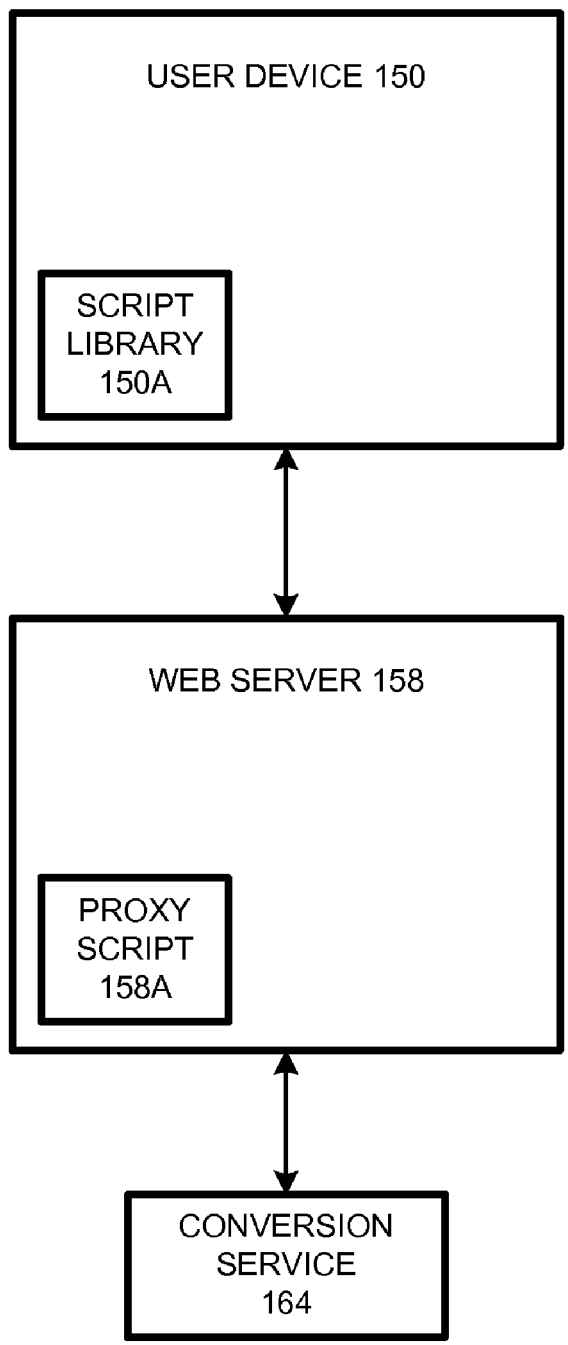
FIG. 1B is a block diagram of a computing environment in which embodiments of the invention may be implemented.

Referring to FIGS. 1A and 1B, in step 104 a drag operation is started by the user. The data or material 400 the user wishes to drag, has a source format 400A. The drag start operation commenced by the user is detected by the user's browser at user device 150, host 158 and conversion service 164. In one embodiment, drag, hovering, and drop are detected by monitoring onDragStart, onDragOver, and onDrop events of a browser.

Figure 3:
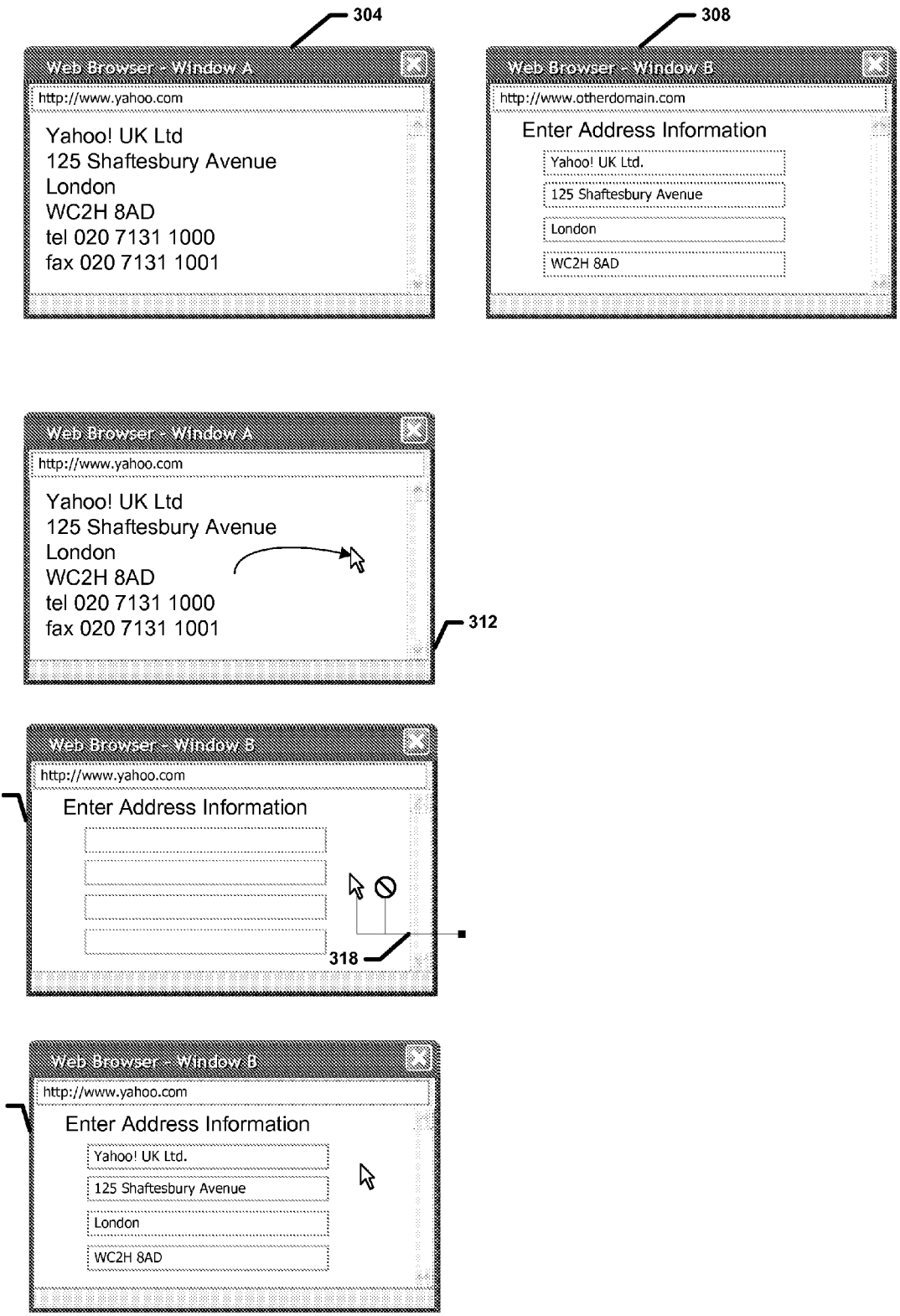
FIG. 3 illustrates browser windows at different states illustrating one embodiment of conversion.

In step 108, the user hovers over target 404 with target format 404A. The hovering operation is detected and indicates that a drop operation is imminent. Note that the format 400A of the material being dragged is different than the format 404A that the target page will accept. Upon sensing that the drop operation is imminent, the host 158 will query the conversion service 164 to determine if a conversion path exists from (source) format 400A to (target) format 404A. If the conversion service 164 determines that a conversion path does not exist in step 112, it will transmit this information to the host 158, which in turn will transmit the information to the user device 150. A browser of other user interface within device 150 will indicate that because no conversion path exists that a proper drop operation is not possible, as seen in step 116. In certain embodiments, this is done with a visual image at the cursor, an example of which is shown in FIG. 3. While the user may decide to release the cursor and perform the drop in any case, he will be aware that a conversion path does not exist, and that the target page will not receive the dragged material in the format it requires. For example, if a target receiving area is prepared to receive the format of a calendar item but instead receives an image or geographic coordinates, the fields of the calendar item will not be properly filled in or completed, as will be discussed below in more detail. The user may thus decide not to complete the impending drop, or alternatively to proceed with the drop.

If a conversion path does exist as determined in step 112, and the user proceeds with the drop, conversion service 164, alone or in conjunction with web server 158, will convert the material 400 from format 400A to format 404A during the drop operation, as seen in step 120. In step 124, the converted material will be manipulated as necessary to execute the drop. This may be done by web server 158 and/or user device 150.

Figure 1C:
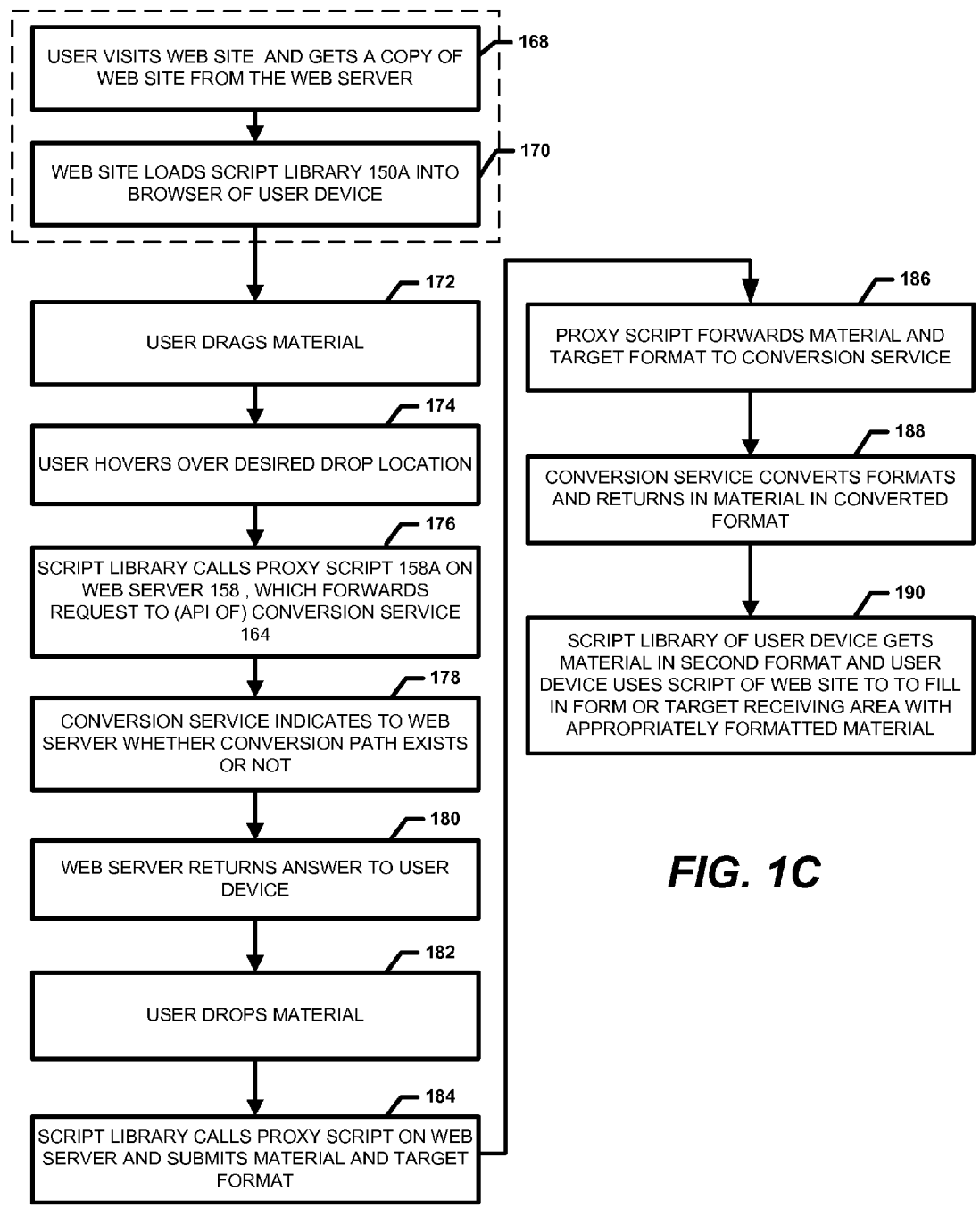
FIG. 1C is a flow chart of a process according to an embodiment of the present invention.

FIG. 1C illustrates another embodiment of a drag and drop conversion process including some preliminary steps 168 and 170. In step 168 a user visits a web site and the user device gets a copy of the web site from the web server. In step 170, the web site loads a script library 150A into a browser of the user device. In step 172 the user the drags some material. The browser of the user device 150 provides the native drag and drop functionality, including events which are monitored by and/or transmitted to the web server 158 and/or conversion service 164. The primary set of events that are monitored are: onDragStart; onDragOver; and onDrop. The start of the drag can be detected by the onDragStart event.

In step 174, the user hovers over a desired drop location. This is detected by the onDragOver event. Then in step 176, script library 150A calls proxy script 158A on web server 158, which forwards the request to an application programming interface of conversion service 164. In step 178, the conversion service indicates to the web server whether a conversion path exists or not. Then in step 180, the web server returns the yes or no answer to the user device. The user then drops the material in step 182 and the onDrop event is noted at the user device. The script library then calls the proxy script on the web server and submits the material together with the desired target format in step 184. In step 186, the proxy script forwards the material and target format to the conversion service. The conversion service then converts the format of the material in step 188 and in step 190 the script library of the user device gets the material in the second format and uses a script of the script library to fill in a form or other target receiving area with appropriately formatted material. Any scripts and script language may be utilized, although Javascripts are utilized in a preferred embodiment. The conversion service may also act as a security proxy and filter details out or warn if sensitive data has been dragged.

Figure 2A:
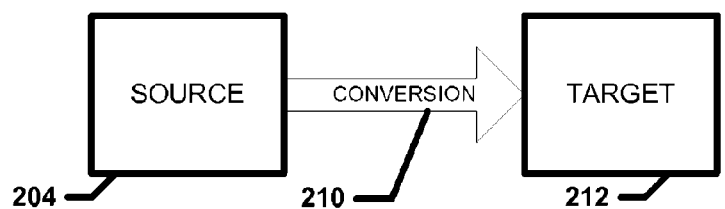
FIG. 2A is a diagram illustrating conversion between source and target.
Figure 2B:
FIG. 2B is a diagram illustrating conversion between a source and target utilizing an intermediary drag bar.

FIGS. 2A and 2B illustrate two different processes incorporating conversion at a high level. In FIG. 2A conversion 210 occurs when material from source 204 is dropped at target 212. In FIG. 2B, material from source 204 is dragged (represented by arrow 206) to drag bar 208. It can later be dragged again to target 212. Conversion 210 occurs when the material dragged from drag bar 208 is dropped at target 212. Note that conversion does not take place from source 204 to drag bar 208, and that a user may drag any number of objects from various sources into drag bar 208. Objects within drag bar 208 may be dragged collectively or individually to a target before being dropped, as will be discussed in greater detail below.

FIGS. 3-7B illustrate different scenarios and permutations of the above described methods in the flow charts. Only a few possible examples of conversion are illustrated for exemplary purposes. It should be understood that many other conversions are possible, and that the claims should in now way be limited to the sample examples discussed herein.

FIG. 3 illustrates browser windows at different states illustrating one embodiment of conversion. Window 304 contains material from a first domain (www.yahoo.com, labeled "Window A,") whereas window 308 contains material from a second domain (www.otherdomain.com, labeled "Window B"). In window 312 the material to be dragged, in this example a business card in the hCard format, is clicked upon and the drag operation commenced. The material is then dragged to window 316. The mouse-cursor will indicate (graphics may vary according to the user device OS and application SW) if there is a known conversion path and if the drop can be successfully completed or not. In one embodiment, a lack of a conversion path will be indicated by a negative visual image 320 such as the circle with the line through it, whereas if there is a conversion path the regular cursor image 320 may be displayed. Upon an indication of a drop, conversion service 164 gets queried synchronously to convert the material from the drag operation shown in window 312. The resultant converted material is used by the web form to fill out the text fields as seen in window 322.

Figure 4:
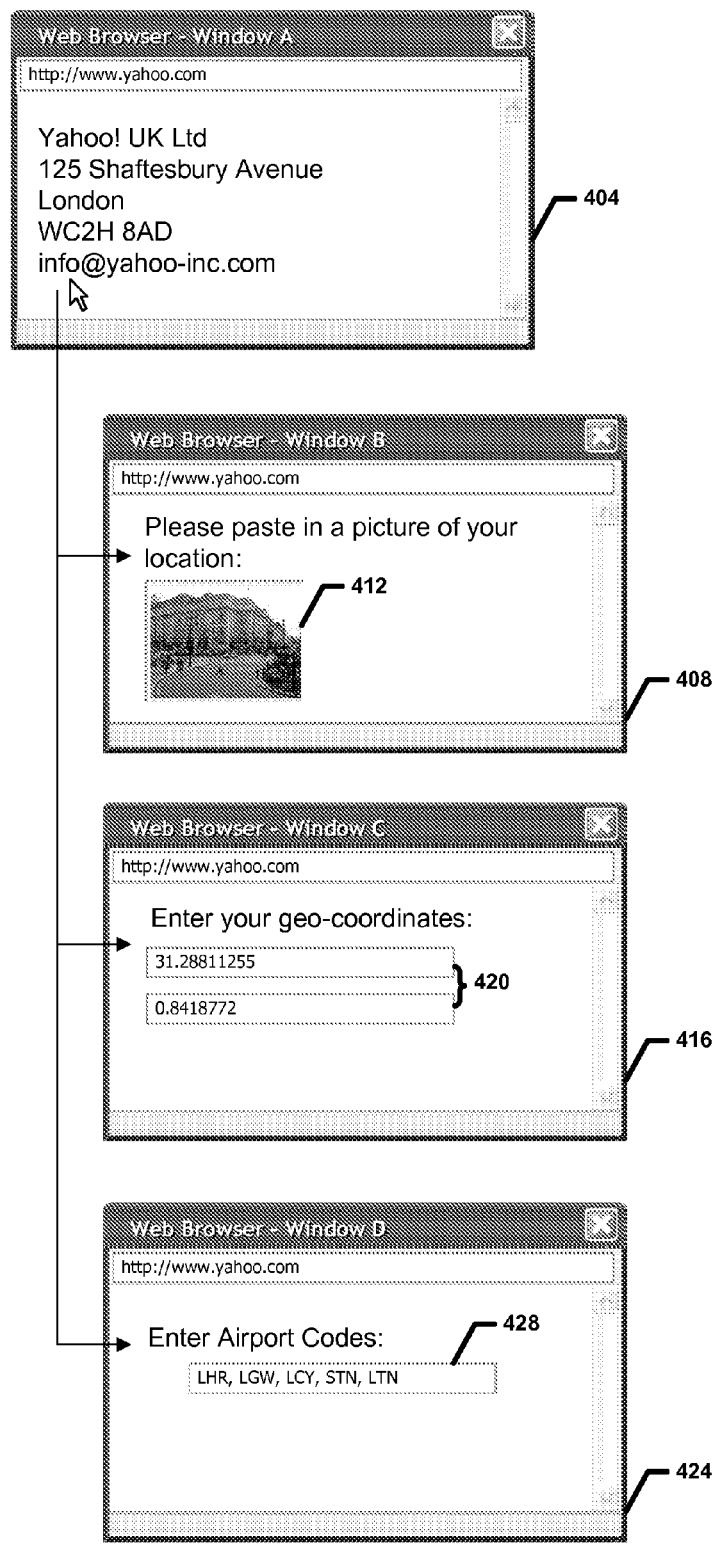
FIG. 4 illustrates browser windows at different states illustrating lookup services associated with an embodiment of conversion.

FIG. 4 illustrates browser windows at different states illustrating lookup services associated with an embodiment of conversion. Window 404 illustrates a standard web page containing a business card with text/html and in the hCard microformat. Window 408 illustrates a web page with a canvas-field 412 that accepts images only, e.g. bitmaps, jpegs, tiffs and the like. Canvas-field 412 is not equipped to accept the hCard format, and therefore the material in the hCard format dragged from window 404. The form requests the conversion service to provide a bitmap of a location specified in the hCard. In other words, the form can ask for an image of or near 125 Shaftsbury Avenue in London or in post code WC2H 8AD. The conversion service can therefore provide a lookup. In one embodiment this comprises the use of a search engine and a keyword. The conversion service then provides the image upon drop.

Window 420 has an area 420 for receiving geo-coordinates. The form thus asks the conversion service to convert the hCard to geo-coordinates. In one embodiment the conversion service accesses a map database or service to return geo-coordinates and upon drop the geo coordinates are entered in area 420.

Window 424 has an area 428 for receiving airport codes. The conversion service will therefore lookup the nearest airport and return the airport code, which will then be entered upon the drop.

Figure 5:
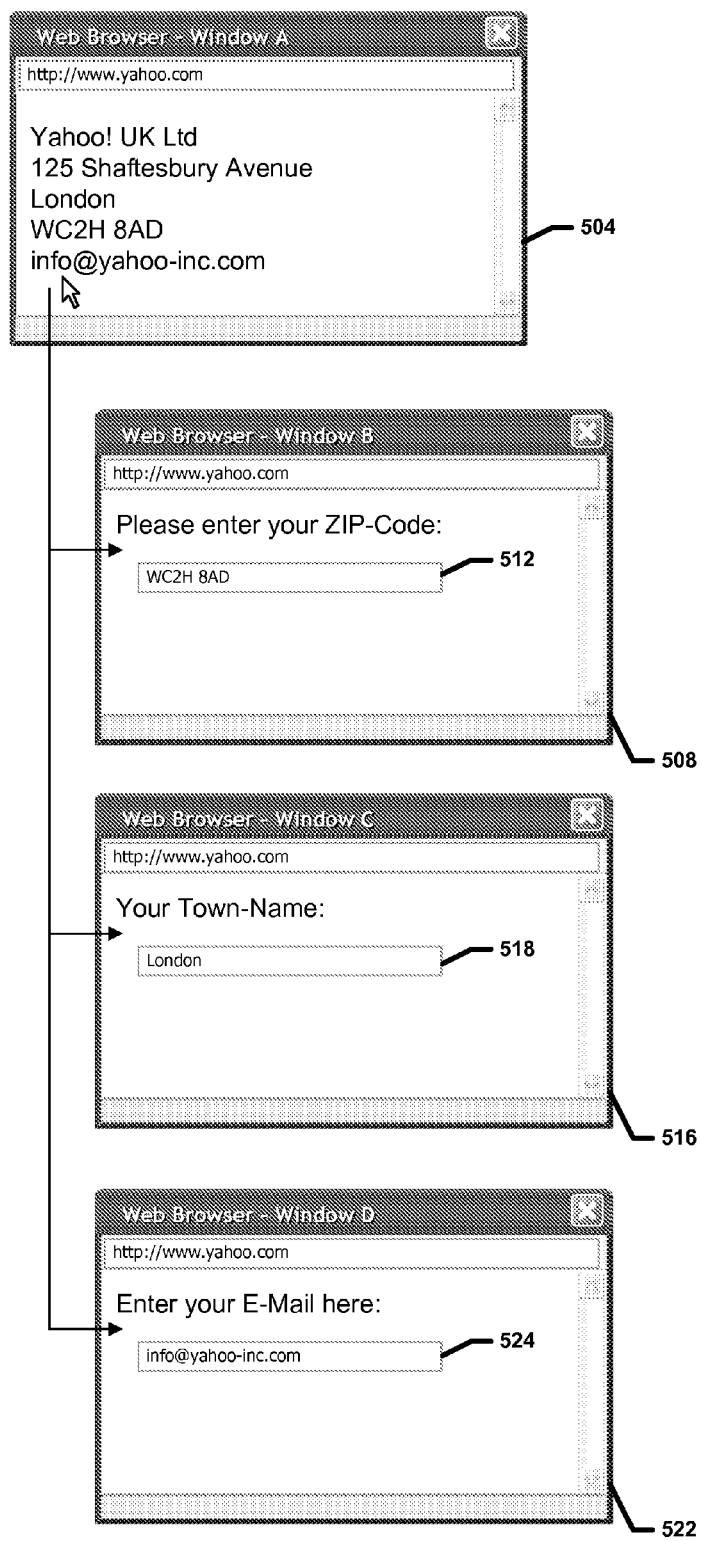
FIG. 5 illustrates browser windows at different states illustrating lookup services associated with an embodiment of conversion.

FIG. 5 illustrates browser windows at different states illustrating extraction services associated with an embodiment of conversion. Window 504 contains a business card in the hCard microformat. A user may wish to drag and drop the business card in any of windows 508, 516, and 522 that are not configured to accept the hCard format. Window 508 has an area 512 for accepting a zip code. When a user drags and drops the business card to area 512, the conversion service will extract the zip code from the business card upon drop. Similarly, window 518 has area 518 with a text field for a town name. The conversion service will extract the town name from the hCard and it will be inserted on drop. Window 522 has a field 524 for an email address, which the conversion service will extract from the hCard upon drop.

Figure 6:
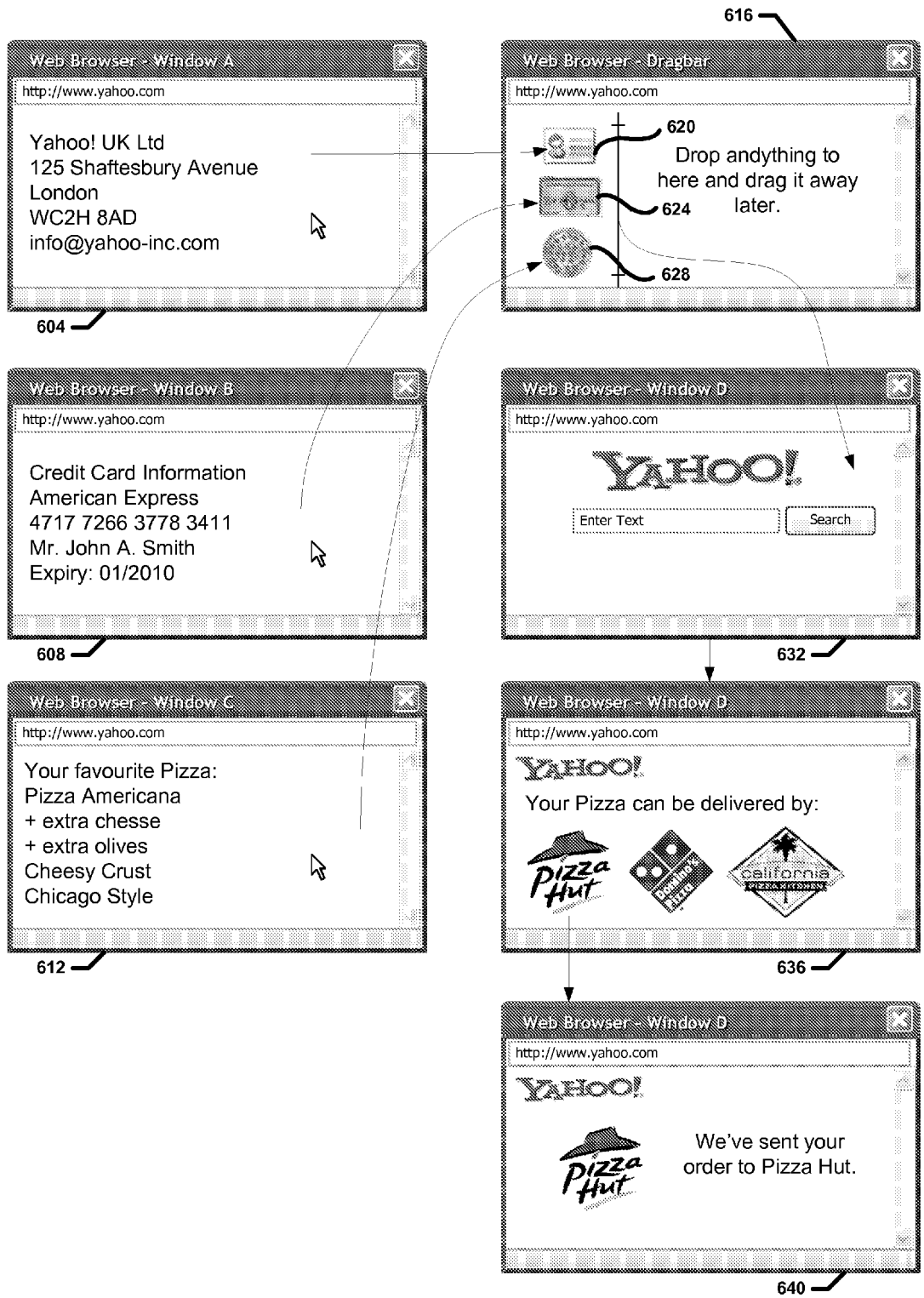
FIG. 6 illustrates browser windows at different states illustrating use of a drag bar associated with an embodiment of conversion.

FIG. 6 illustrates browser windows at different states illustrating use of a drag bar associated with an embodiment of conversion. The dragbar 616 is an intermediate respository where material is dragged. Note that when material is dragged to the dragbar, it will not be converted upon drop. More specifically, the various scripts and the conversion service will not upon detecting the onDrop of the browser call for or make any conversion. As described earlier with regard to FIG. 2B, the conversion will take place when material is dragged and dropped from the dragbar to a target page or form. In window 604, a business card in an hCard format is dragged to dragbar 616, as represented by icon 620. Payment information such as a credit card account in window 608 is also dragged to dragbar 616, as represented by credit card icon 624. Information regarding a pizza in window 612 is dragged to dragbar 616, as represented by the pizza icon 628. The information relating to the pizza and payment information may be in any recognizable format (as may the business card).

Then the user drags all three icons and the underlying material (in one drag operation), to a search engine, as seen in window 632. The conversion service will, upon drop, work in conjunction with the search engine to determine a provider of the pizza (representing a desired good or service) willing accept the method of payment and to deliver (provide the good or service) the pizza to the address specified by the business card. In one embodiment, the conversion service coalesces the material and formulates a query (e.g. pizza delivery near [address] and pizza [type a, b, c] with items [xyz]. In another embodiment, the conversion service is integrated into the search provider facilities. Note that establishments may have proprietary formats as mentioned earlier. For example, Pizza Hut may have one format for specifying what style crust and what toppings are requested, whereas Domino's and California Pizza Kitchen may have another. These proprietary formats may be converted to a open pizza (good or service) format, which can then be dropped into the search field of the search page.

As seen in window 36, the search engine returns results indicating what providers will accept the method of payment and provide the specified good or service. In this example, the specification further includes those providers offering delivery. The user can then click on or drag and drop an icon of a provider to execute a transaction. Window 640 illustrates order confirmation.

Figure 7A:
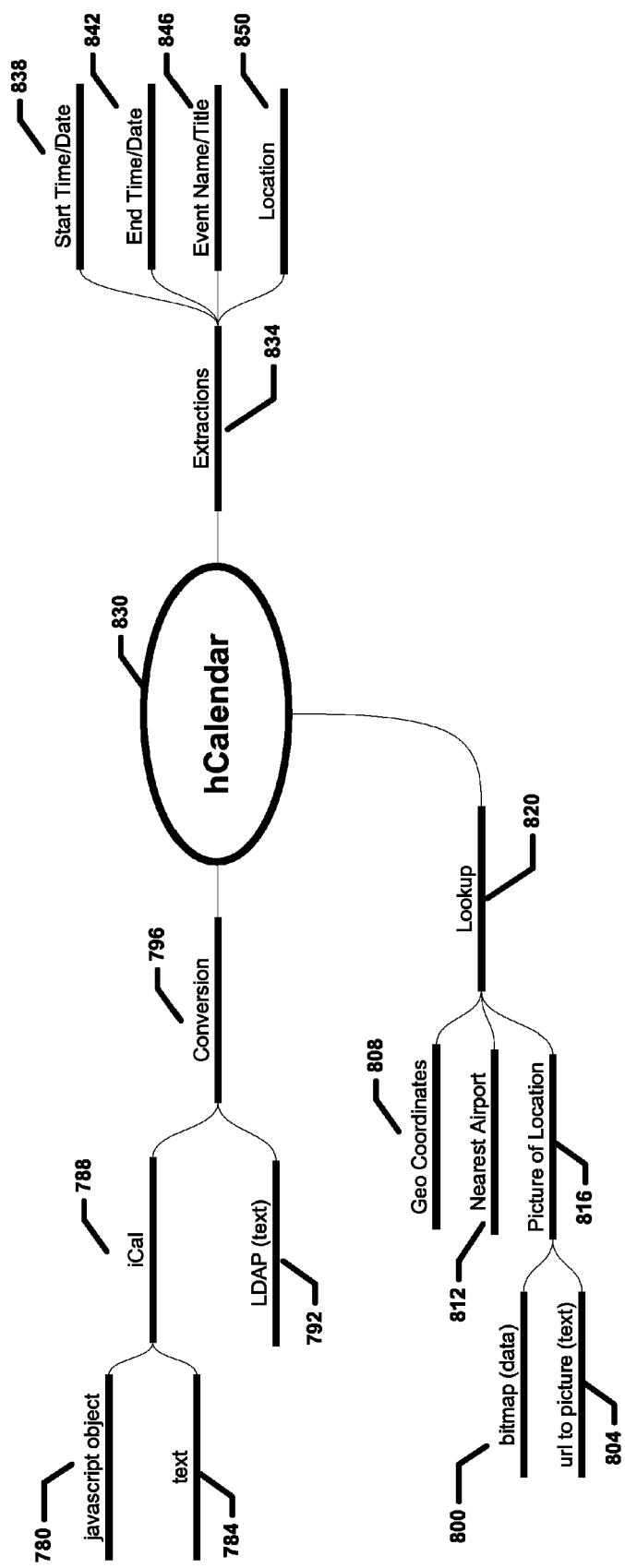
FIGS. 7A-7B illustrate some exemplary conversion paths.
Figure 7B:
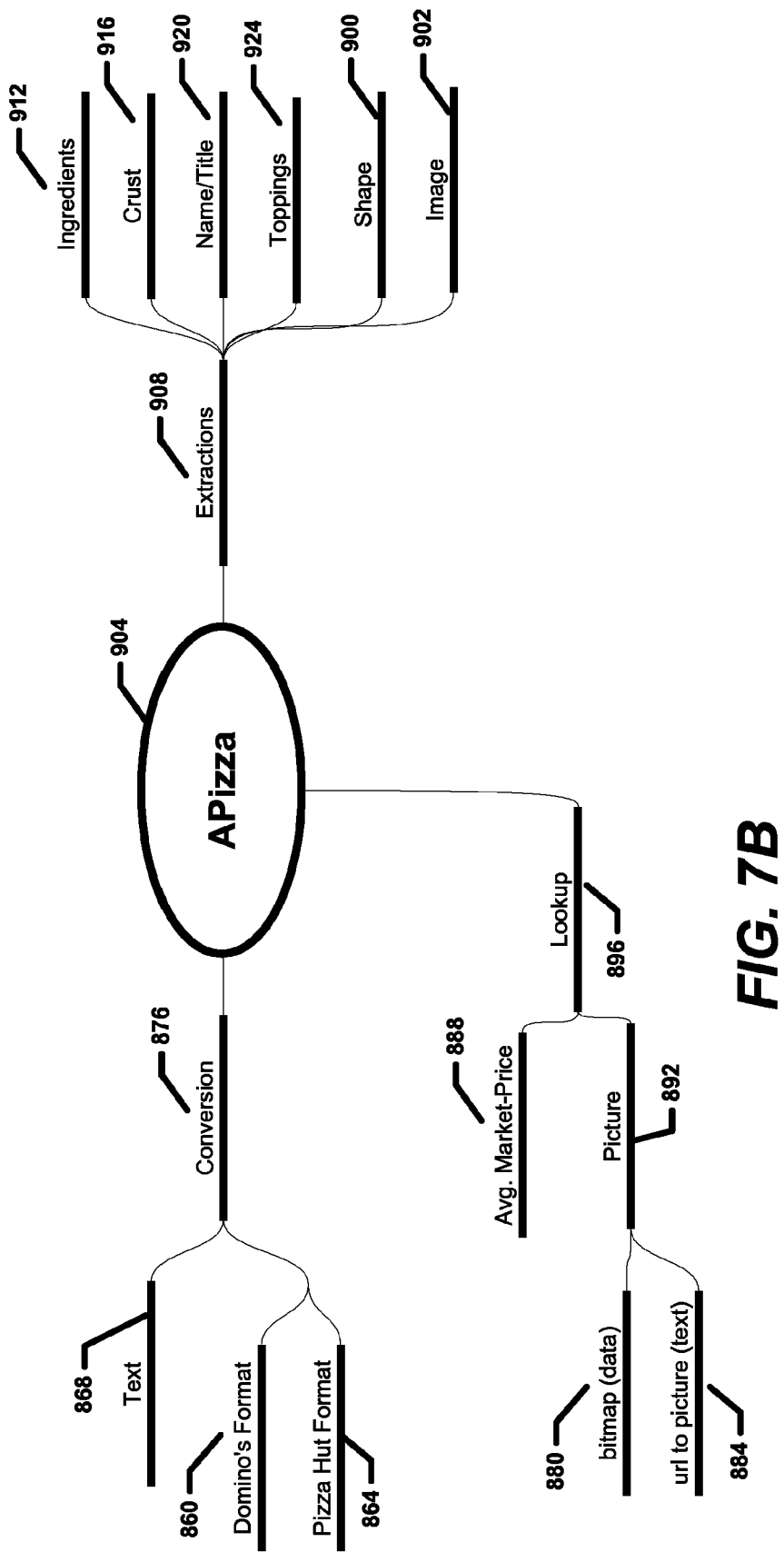

FIGS. 7A-7B illustrate some exemplary conversion paths, including associated lookup. These examples are provided for illustrative purposes, are not meant to be exhaustive, and should not limit the scope of the appended claims.

In FIG. 7A, material 730 in the hCard format may be undergo conversion 796, extractions 834, or lookup 820 by the conversion service. Extractions and lookup may be considered part of the conversion or separate processes. The start time/date 838, end time/date 842, event name/title 846, and location 850 of a calendar item may be extracted from hCalendar 830. Some material, however, cannot be extracted from certain formats and needs to be looked up. For example, geographic coordinates 808, the nearest airport 812, and a picture or image of a location 816 can be looked up based upon the hCalendar material. The picture may comprise the picture itself 800 and/or a link to the picture (url to picture). The hCalendar item 830 may be converted to, for example, the iCal format 788 comprising javascript object 780, or LDAP (text) format 792.

An open (non proprietary) format for a good, in this example an "Apizza" format 904 and the material therein is shown in FIG. 7B. Again, extractions 908, lookups 896, and conversions 876 may occur. Ingredients 912, crust 916, a name/title for the pizza 920, toppings 924, shape 900 (round, square etc.), and image 902 may be extracted. Other material such as an image/picture 892 may be looked up if extraction is not possible or desirable. The picture may be either an image file 880 such as a bitmap etc. or a link 884. Material from the Apizza format may be converted to text 868 or into other formats such as Domino's (proprietary) format 860 or Pizza Hut's format 864.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer implemented method, comprising:
   detecting the start of a drag operation at a first location of first material in a first format;
   receiving the first material from the first location at a drag bar;
   detecting the start of a drag operation at a second location of second material in a second format;
   receiving the second material from the second location at the drag bar, wherein the second material includes a payment method or indication thereof;
   detecting a drag operation including both the first and second material at the drag bar;
   performing a conversion of the second material upon dropping the first and second material into a search engine; and
   fulfilling a query request via the search engine based upon both the first and second material, wherein fulfilling the query request includes searching a database to identify merchants that accept the payment method.

2. The method of claim 1, wherein receiving the first material from the first location in the first format at the drag bar comprises receiving material including a service address or indication thereof, wherein fulfilling the query request further comprises searching a database to identify merchants near the service address that accepts the payment method.

3. The method of claim 2, further comprising:
   detecting the start of a drag operation at a third location of third material in a third format; and
   receiving the third material from the third location at the drag bar, wherein receiving the third material from from the third location at the drag bar comprises receiving material describing a good or service.

4. The method of claim 3, wherein fulfilling the query request further comprises searching a database and determining if any merchants near the sercice address accept the payment method and offer delivery of the good or service to the service address.

5. The computer implemented method of claim 2, further comprising:
   performing a conversion of the first material upon dropping the first and second material into a search engine.

6. The computer implemented method of claim 1, wherein the first location comprises a first domain.

7. The computer implemented method of claim 6, wherein the second location comprises a second domain.

8. The computer implemented method of claim 1, wherein the first location comprises a first browser window.

9. The computer implemented method of claim 8, wherein the second location comprises a second browser window.

10. The computer implemented method of claim 1, wherein the query request is fulfilled after performing the conversion.

11. A computer implemented method, comprising:
    detecting the start of a drag operation at a first location of a first grouping of first material;
    receiving the first material from the first location at a drag bar, the first material being in a first format;
    detecting the start of a drag operation at a second location of a second grouping of second material;
    receiving the second material from the second location at the drag bar, wherein receiving the second material from the second location at the drag bar includes receiving material including a payment method or indication thereof;
    detecting a drag operation including both the first and second material at the drag bar;
    performing a conversion of the second material;
    generating a query request from the first material and the second material; and
    fulfilling the query request based upon the first and second material, wherein fulfilling the query request includes searching a database to identify merchants that accept the payment method.

12. A computer implemented method, comprising:
    detecting the start of a drag operation at a first location of a first grouping of first material indicative of an address or location;
    receiving the first material from the first location at a drag bar, the first material being in a first format;
    detecting the start of a drag operation at a second location of a second grouping of second material indicative of a good or service desired, the second material being in a second format;
    receiving the second material from the second location at the drag bar;
    detecting a drag operation including both the first and second material at the drag bar;
    performing a conversion of at least one of the first or second material;
    generating a query from the first material and the second material;
    executing the query to identify a merchant offering the good or service near the address or location; and
    presenting the results, the results indicating the merchant offering the good or service near the address or location.

13. The method of claim 12, further comprising detecting the start of a drag operation at a third location of a third grouping of third material indicative of a payment method, wherein executing the query includes identifying a merchant offering the good or service near the address or location that accepts the payment method, wherein the merchant accepts the payment method.

14. The computer implemented method of claim 13, wherein the drag operation further comprises the third material, wherein performing a conversion further comprises converting the third material.

15. The computer implemented method of claim 14, wherein performing a conversion is performed upon dropping the first, second, and third material into a search engine.

16. The computer implemented method of claim 12, wherein performing a conversion of at least one of the first or second material is performed upon dropping the first and second material into a search engine, target page, or form.

17. The computer implemented method of claim 12, wherein the query is executed after performing the conversion.

18. The computer implemented method of claim 12, wherein performing a conversion of at least one of the first or second material comprises performing a conversion of the second material.

19. A non-transitory computer-readable medium storing thereon computer-readable instructions, comprising:
    instructions for detecting the start of a drag operation at a first location of first material in a first format;
    instructions for obtaining the first material from the first location at a drag bar;

instructions for detecting the start of a drag operation at a second location of second material in either the first format or a second format;

instructions for obtaining the second material from the second location at the drag bar, wherein obtaining the second material from the second location at the drag bar includes obtaining material indicating a good or service desired;

instructions for detecting the start of a single drag operation including both the first and second material at the drag bar;

instructions for performing a conversion of the second material upon dropping the first and second material into a search engine; and instructions for fulfilling a query request via the search engine based upon both the first and second material, wherein fulfilling the query request includes searching a database to identify merchants that offer the good or service.

20. The non-transitory computer-readable medium of claim 19, wherein the first material comprises a payment method or indication thereof, wherein fulfilling the query request comprises searching a database to identify merchants offering the good or service that accept the payment method.

* * * * *

UNITED STATES PATENT AND TRADEMARK OFFICE
CERTIFICATE OF CORRECTION

PATENT NO.         : 8,413,063 B2  
APPLICATION NO.    : 12/352902  
DATED              : April 2, 2013  
INVENTOR(S)        : Aron Spohr and Bhanu Singh Page 1 of 1

It is certified that error appears in the above-identified patent and that said Letters Patent is hereby corrected as shown below:

In the Claims

1. Column 7, lines 30-31, Claim 2, change "...merchants near the service address that accepts the payment..." to -- merchants near the service address that accept the payment --

2. Column 7, lines 36-37, Claim 3, change "...wherein receiving the third material from from the third location..." to -- wherein receiving the third material from the third location --

3. Column 7, line 41, Claim 4, change "...if any merchants near the sercice address accept..." to -- if any merchants near the service address accept --

Signed and Sealed this  
Seventh Day of April, 2015

Michelle K. Lee  
*Director of the United States Patent and Trademark Office*